United States Patent
Klein (10) Patent No.: US 10,294,925 B2
(45) Date of Patent: May 21, 2019

(54) WIND TURBINE ROTOR BLADE HAVING AN ELECTRIC HEATING DEVICE

(71) Applicant: Nordex Energy GmbH, Hamburg (DE)

(72) Inventor: Hendrik Klein, Rostock (DE)

(73) Assignee: Nordex Energy GmbH, Hamburg (DE)

(*) Notice: Subject to any disclaimer, the term of this patent is extended or adjusted under 35 U.S.C. 154(b) by 236 days.

(21) Appl. No.: 15/342,978

(22) Filed: Nov. 3, 2016

(65) Prior Publication Data

US 2017/0122295 A1 May 4, 2017

(30) Foreign Application Priority Data

Nov. 3, 2015 (EP) .................................... 15192757

(51) Int. Cl.
*F03D 80/40* (2016.01)
*F03D 1/06* (2006.01)
*F03D 80/30* (2016.01)

(52) U.S. Cl.
CPC ........... *F03D 80/40* (2016.05); *F03D 1/0675* (2013.01); *F03D 80/30* (2016.05)

(58) Field of Classification Search
CPC .......... F03D 80/40; F03D 80/30; F03D 80/60; F03D 16/0675; F01D 5/08; F01D 25/02; F24H 2250/00; F05D 2240/20; F05D 2270/60; B64D 15/12

See application file for complete search history.

(56) References Cited

U.S. PATENT DOCUMENTS

| | | | |
|---|---|---|---|
| 5,947,418 A | 9/1999 | Bessiere et al. | |
| 6,338,455 B1* | 1/2002 | Rauch | B64D 15/12 244/134 D |
| 6,612,810 B1* | 9/2003 | Olsen | F03D 80/40 415/4.5 |
| 7,556,221 B2* | 7/2009 | Hindel | B64D 15/12 219/202 |

(Continued)

FOREIGN PATENT DOCUMENTS

| | | |
|---|---|---|
| DE | 20 2012 101 705 U1 | 9/2012 |
| DE | 20 2013 007 659 U1 | 1/2015 |

(Continued)

*Primary Examiner* — Dwayne J White
*Assistant Examiner* — Jackson N Gillenwaters
(74) *Attorney, Agent, or Firm* — Walter Ottesen, P.A.

(57) ABSTRACT

Wind turbine rotor blade having an electric heating device for heating a heatable surface region which extends over a longitudinal section of the wind turbine rotor blade, wherein the electric heating device has a blade-tip-side end, a blade-root-side end and two profile-trailing-edge-side edges, and two outer electric conductors which are connected to the electric heating device along the profile-trailing-edge-side edges and via which the electric heating device can be supplied with a heating current, wherein at least one central electric conductor which is connected to the electric heating device at a distance from the two profile-trailing-edge-side edges in such a way that the electric heating device is divided by the at least one central electric conductor into at least two partial regions which each extend over the longitudinal section and can be supplied with an electric heating current separately from one another via two of the conductors.

15 Claims, 4 Drawing Sheets (56) References Cited

U.S. PATENT DOCUMENTS

| | | | | |
|---|---|---|---|---|
| 8,991,763 | B2* | 3/2015 | Guillermond | B64D 15/12 244/134 R |
| 9,816,482 | B2* | 11/2017 | Caruso | F03D 1/0675 |
| 2008/0099617 | A1* | 5/2008 | Gilmore | F03D 80/40 244/134 R |
| 2013/0170992 | A1 | 7/2013 | Loewe et al. | |
| 2013/0270253 | A1* | 10/2013 | Botura | B64D 15/12 219/475 |
| 2014/0086748 | A1* | 3/2014 | Peltola | B23P 15/04 416/95 |
| 2014/0199170 | A1* | 7/2014 | Madsen | B23P 15/04 416/95 |
| 2014/0348654 | A1 | 11/2014 | Klein | |
| 2015/0189699 | A1* | 7/2015 | Ploshikhin | H05B 3/34 219/541 |

FOREIGN PATENT DOCUMENTS

| | | |
|---|---|---|
| EP | 2 843 228 A1 | 3/2015 |
| EP | 2 857 678 A1 | 4/2015 |
| WO | 2011/096851 A1 | 8/2011 |
| WO | 2011127996 A1 | 10/2011 |
| WO | 2011127997 A1 | 10/2011 |

\* cited by examiner

WIND TURBINE ROTOR BLADE HAVING AN ELECTRIC HEATING DEVICE

CROSS REFERENCE TO RELATED APPLICATION

This application claims priority of European patent application no. 15192757.1, filed Nov. 3, 2015, the entire content of which is incorporated herein by reference.

FIELD OF THE INVENTION

The invention relates to a wind turbine rotor blade having an electric heating device for heating a heatable surface region which extends over a longitudinal section of the wind turbine rotor blade, wherein the electric heating device has a blade-tip-side end, a blade-root-side end and two profile-trailing-edge-side edges. Along the profile-trailing-edge-side edges, two outer electric conductors are connected to the electric heating device, with the result that the electric heating device can be supplied with a heating current via the two outer electric conductors.

BACKGROUND OF THE INVENTION

Such electric heating devices are used to counteract icing up of the rotor blades. The devices are made of an electrically conducting material and during operation a heating current flows through them and brings about heating of the heating device. As a result, on the one hand, ice which has already adhered is thawed (de-icing), and, on the other hand, icing can be prevented (anti-icing).

In order to achieve the desired effect, a sufficient temperature difference with respect to the surroundings must be achieved in the entire heatable surface region. At the same time, excessive heating is to be avoided, in particular in order to prevent damage to the rotor blade. Heating which goes beyond the necessary extent is also to be avoided in order to keep the energy consumption of the heating device as low as possible.

DE 20 2012 101 705 U1 has disclosed a wind turbine rotor blade having an electric heating device which is energized via two electrodes running in the longitudinal direction of the heating device and which is to have a gel layer.

WO 2011/127996 A1 has disclosed a wind turbine rotor blade having an electric heating device which has a plurality of sections partially connected in series. The electric heating device runs in the form of a loop from a root-blade-side end as far as a blade-tip-side end and back and is connected to electric leads in the region of the blade root.

U.S. Pat. Nos. 5,947,418 and 6,338,455 have disclosed rotor blades for helicopters which have a plurality of strips which run in the longitudinal direction of the rotor blades and whose blade-tip-side ends are connected to one another and whose blade-root-side ends are connected to electric connecting leads. A heating current also flows through them in a loop shape from the blade root as far as the blade tip and back.

WO 2011/096851 A1 has disclosed a wind turbine rotor blade having an electric heating device which is composed of different heating elements and leads which each have carbon nanotubes. The heatable surface is divided into numerous fields, each of which is assigned an icing up sensor. If icing up is detected in one of the fields, this field is to be able to be heated selectively.

United States patent application publication 2014/0348654 has disclosed a wind turbine rotor blade having an electric heating device which is supplied with a heating current via two outer electric leads. The electric leads serve at the same time as lightning arrestor leads.

EP 2 843 228 A1 has disclosed a wind turbine rotor blade having an electric heating element which is constructed from bundles of electrically conductive fibers which each form an individual current path. The power supply is provided via two electric leads which run in the longitudinal direction of the rotor blade and are connected to the individual fiber bundles.

SUMMARY OF THE INVENTION

It is an object of the invention to provide a wind turbine rotor blade having an electric heating device which is of simple configuration and has heating power which is appropriate for demand under different operating conditions.

The object can, for example, be achieved via a wind turbine rotor blade having:
- an electric heating device for heating a heatable surface region which extends over a longitudinal section of the wind turbine rotor blade, wherein the electric heating device has a blade-tip-side end, a blade-root-side end and two profile-trailing-edge-side edges, and
- two outer electric conductors which are connected to the electric heating device along the profile-trailing-edge-side edges and via which the electric heating device can be supplied with a heating current, and
- at least one central electric conductor which is connected to the electric heating device at a distance from the two profile-trailing-edge-side edges in such a way that the electric heating device is divided by the at least one central electric conductor into at least two partial regions which each extend over the longitudinal section and can be supplied with an electric heating current separately from one another via two of the conductors.

The term the heatable surface region of the wind turbine rotor blade is meant to refer to the entire outer area of the wind turbine rotor blade which can be heated with the electric heating device. Outside the heatable surface region, it is not possible to heat the wind turbine rotor blade. The longitudinal section of which the heatable surface region extends can extend over at least 25%, over at least 40%, over at least 60% or over at least 80% of the entire length of the wind turbine rotor blade. The longitudinal section can reach up, in particular, close to a blade tip. The heatable surface region can include a profile nose edge and can extend from there a certain amount in the direction of the profile end edge in the direction of flow along the pressure side and along the suction side, at which profile end edge the surface region has in each case a profile-trailing-edge-side edge.

The two outer electric conductors can be made of metal, in particular from copper, and are connected to the electric heating device along the profile-trailing-edge-side edges. For this purpose, the electric conductors can be arranged in the region of the profile-trailing-edge-side edges. They can be in electrical contact with the electric heating device over the entire length thereof or in certain sections or at certain points. In each case, the electric heating device is connected to the two outer electric conductors in such a way that when the heating device is energized via the two outer conductors the entire heatable surface region is heated.

The heating current supplied by the two outer electric conductors flows through the heating device in a direction substantially perpendicular to a longitudinal axis of the wind turbine rotor blade. In other words, the heating current supplied by the two outer electric conductors flows in a direction along the profile, from one of the profile-trailing-edge-side edges of the heating device to the other one of the profile-trailing-edge-side edges of the heating device. A heating current supplied by any other combination of electric conductors including one or both of the two outer electric conductors and the at least one central conductor will flow generally in the same direction, that is in a direction substantially perpendicular to a longitudinal axis of the wind turbine rotor blade.

With the invention there is at least one central electric conductor which is connected to the electric heating device at a distance from the two profile-trailing-edge-side edges. The electric conductor can be arranged between the two profile-trailing-edge-side edges, for example near to a profile nose edge or between the profile nose edge and a profile-trailing-edge-side edge. When a plurality of central electric conductors are used they can be arranged distributed between the outer electric conductors, for example at approximately equal distances from one another and from the outer electric conductors. All the electric conductors, that is, the outer electric conductors and the at least one central electric conductor, can be arranged essentially along the longitudinal direction of the wind turbine rotor blade. This relates, in particular, to the longitudinal section in which the electric heating device is arranged. From the blade-root-side end of the electric heating device, the electric conductors can be made to extend further as far as the root blade where they can be supplied with electric current via the hub of a rotor, provided with the wind turbine rotor blade, of a wind turbine. The two outer electric conductors and the at least one central electric conductor can each extend over the entire longitudinal section.

The at least one central electric conductor divides the electric heating device into at least two partial regions each extending over the longitudinal section. The partial regions can each form an elongate strip which can have a uniform width or a width which decreases from the blade-root-side end towards the blade-tip-side end. In particular, each of the partial regions can be embodied essentially in a trapezoidal shape.

Each of the partial regions can be supplied with an electric heating current via two conductors. When a single central conductor is used, one of the partial regions can be supplied via one of the outer conductors and the central conductor, and the other partial region can be supplied via the other outer conductor and the central conductor. The central conductor is therefore responsible for supplying both partial regions adjoining it. The partial regions are connected electrically in series, wherein the end points of the series circuit are connected to the two outer conductors and in each case a node point is formed between two adjacent partial regions and is connected to a central conductor. Therefore, only a very small number of connecting points are required to supply the entire electric heating device with current selectively and in different ways. In particular, a suitable connection of the two outer conductors and of the at least one central conductor permits selective heating of just one partial region, of individual partial regions or of all the partial regions. Even if only a single and constant supply voltage is available for the electric heating device, the arrangement according to the invention permits simple adaptation of the heating power. For example, the supply voltage can be applied to the two outer conductors. The heating current then flows through all the partial regions. In this context, the heating current for all the partial regions is of equal magnitude and is relatively small, since the electrical resistances of all the partial regions are connected in series. Alternatively, for example two partial regions can be connected in parallel by applying one pole of the supply voltage to, for example, the two outer conductors, and the other pole to a central conductor arranged between them. Of course, any of the partial regions can also be connected individually to the supply voltage, independently of the adjoining partial regions.

In one embodiment, precisely two of the central electric conductors are present, with the result that the electric heating device is divided into three partial regions each extending over the longitudinal section, wherein a profile nose edge of the wind turbine rotor blade is oriented in a central partial region of the three partial regions. In the region of the profile nose edge, the risk of icing up of the wind turbine rotor blade is generally particularly pronounced, with the result that when two central conductors are used this critical region can be heated selectively.

In one embodiment, electrical connections are produced between the electric heating device and the conductors by bonding, welding, riveting or screwing. In the case of bonding, for example an electrically conductive adhesive can be used. All the specified forms of connection produce a galvanic connection. If the electric heating device has carbon fibers, they can therefore be connected directly to the electric conductors.

In one embodiment, the electric heating device has a planar carbon fiber material. For example, scrims or a woven fabric made of carbon fibers or carbon fiber bundles, referred to as rovings, can be used. Such planar carbon fiber materials, also referred to as heating mats, have relatively homogeneous electrical conductivity. Since the individual carbon fibers are in electrical contact with one another, in the case of woven fabrics, in particular in the region of intersection points, the electrical conductivity is relatively robust with respect to damage to individual fibers. Planar carbon fiber materials are easy to operate and achieve a heating power which is relatively uniform over the area.

In one embodiment, the electric heating device has electrically conductive fiber bundles which are each electrically connected to at least two of the electric conductors and are electrically insulated from one another. In this embodiment, each fiber bundle forms an individual current path. The fiber bundles can be arranged, in particular, in a meandering shape, with the result that the length of the current paths can be selected in a targeted fashion with respect to the required heating power. As a result, the electric heating device can be configured in such a way that it achieves a heating power which is appropriate for demand. The electrically conductive fiber bundles can be made, for example, of carbon fibers, copper alloys or stainless steel fibers.

In one embodiment, at least one of the electrically conductive fiber bundles has two ends which are each electrically connected to one of the two outer electric conductors and has a central section which intersects the at least one central electric conductor and is connected thereto in an electrically conductive fashion. All the fiber bundles are preferably connected in this way. The fiber bundles can be arranged in such a way that the area efficiency in the individual partial regions can be predefined in a way which is appropriate for demand.

In one embodiment, the specific area heating efficiency which is made available by the electric heating device when a defined voltage is applied to in each case two of the conductors which are arranged adjacent to one another in the respective partial regions is of different magnitudes. A particularly high heating power in one of the partial regions can be achieved, for example, by virtue of the fact that the electric heating device has a relatively low electrical resistance between the electric conductors which bound this partial region. Alternatively or additionally, the size of the partial region can be selectively predefined by corresponding arrangement of the electric conductors, with the result that, for example, a heating power which is determined by the electrical properties of the heating device is made available on a smaller area and the specific area efficiency is particularly high there. In this respect, for example in the region of the profile nose edge, a higher specific area efficiency can be predefined than in partial regions which are arranged further towards the profile end edge.

In one embodiment, the specific area heating efficiency which is made available by the electric heating device varies over the length of a partial region. This measure can also be provided for more than one of the partial regions, in particular for all the partial regions. As a result, for example a higher heating power per unit area can be made available near to the blade tip than closer to the blade root. For this purpose, the width of the respective partial region can also be varied over the length and/or the electrical properties of the heating device in the partial region can be adapted. For example, a central partial region can have a multiplicity of individual fiber bundles which are each connected to two central electrical conductors, wherein the length of the fiber bundles between the two electric conductors decreases towards the blade tip. In addition to the differentiation over the different partial regions, a heating power which is appropriate for demand can also be made available within individual partial regions in this way.

In one embodiment, a controller is present which is configured to actuate the electric heating device in a de-icing operating mode in which all the partial regions are operated with a first area heating efficiency, and in an anti-icing operating mode in which a central partial region is operated with a second area heating efficiency which is higher than the first area heating efficiency and in which the other partial regions are operated with a third area heating efficiency which is lower than the first area heating efficiency. The de-icing operating mode is appropriate, for example, in the case of a stationary rotor or in the coasting mode if ice is already adhering to the entire heatable surface region. The de-icing operating mode then brings about relatively uniform heating of the entire heatable surface region. The anti-icing operating mode is suitable, in particular, for the production operation of the wind turbine if relatively high heating power is required in the region of the profile nose edge in order to keep it free of ice, while icing up is considered rather unlikely in the partial regions arranged further behind in the direction of flow.

In one embodiment, the wind turbine rotor blade has at least one lightning arrestor receptor to which each of the conductors is connected in an electrically conductive fashion in the case of a lightning strike. The lightning arrestor receptor can be arranged, for example, near to a blade tip of the wind turbine rotor blade or form the blade tip. The electric conductors, that is, the two outer electric conductors and all the central electric conductors which are present are connected to the lightning arrestor receptor in the case of a lightning strike, that is, for example via a spark gap or some other overvoltage protection. In the case of a lightning strike, the very high lightning current can then be distributed over all the electric conductors which are present. This can prevent damage to the conductors. Connecting all the specified conductors to one another via the partial regions of the electric heating device also brings about potential equalization between the electric conductors, which equalization can be necessary and sufficient to avoid flashovers owing to electromagnetic induction.

In one embodiment, one of the two outer conductors and/or both outer conductors and/or the at least one central conductor is/are arranged adjacent to a spar cap of the wind turbine rotor blade and/or is/are integrated into a spar cap cross section. The division of the electric heating device is configured in this case in accordance with the arrangement of the spar caps, which is particularly expedient in many cases. Furthermore, the electric conductors can be integrated into the manufacture of the spar caps in terms of fabrication technology, which can simplify the assembly of the wind turbine rotor blade. With respect to lightning protection, electrical contact can also be produced between the spar caps and the electric conductors, which, in the case of electrically conductive spar caps, in particular if they have carbon fibers, counteracts damage to the spar caps.

In one embodiment, two of the central conductors and four spar caps are present, wherein one of the two outer conductors is assigned to a first, pressure-side spar cap, the other of the two outer conductors is assigned to a first, suction-side spar cap, one of the two central conductors is assigned to a second, pressure-side spar cap, and the other of the two central conductors is assigned to a second, suction-side spar cap. The fact that a conductor is assigned to a spar cap is intended to mean, in particular, that the conductor is arranged adjacent to the spar cap or is integrated into a cross section of the spar cap. The specified arrangement of the conductors is particularly expedient for wind turbine rotor blades with four spar caps.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
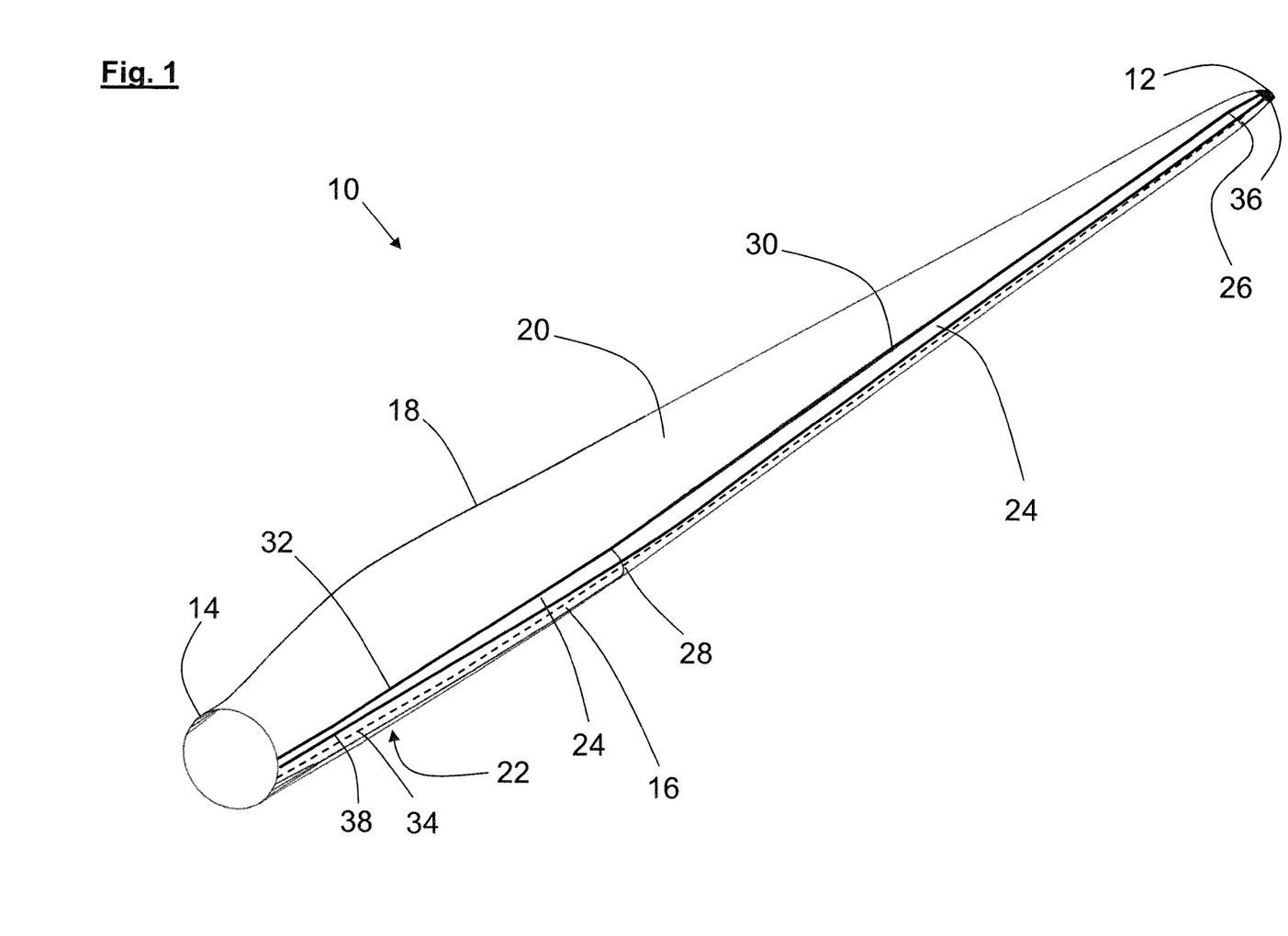
FIG. 1 shows a wind turbine rotor blade according to the invention in a simplified perspective view.

The wind turbine rotor blade 10 in FIG. 1 has a blade tip 12, a blade root 14, a profile nose edge 16, a profile end edge 18, a pressure side 20 and a suction side 22. The electric heating device 24 corresponds in its dimensions to a heatable surface region of the wind turbine rotor blade 10 and has a blade-tip-side end 26, a blade-root-side end 28 and two profile-trailing-edge-side edges 30, 31, of which the profile-trailing-edge-side edge 30 which is arranged on the pressure side 20 can be seen.

Two outer electric conductors 32, 34 each run from the blade root 14 as far as a lightning arrestor receptor 36 which is arranged at the blade tip 12. In the longitudinal section between the blade-tip-side end 26 and the blade-root-side end 28 of the electric heating device 24, the two outer electric conductors 32, 34 run along the profile-trailingedge-side edges 30, 31 and are electrically connected there to the electric heating device 24 over their entire length. A central electric conductor 38, which runs approximately along the profile nose edge 16, is arranged between the two outer conductors 32, 34. The central electrical conductor 38 also extends from the blade root 14 as far as the lightning arrestor receptor 36 at the blade tip 12 and is electrically connected to the electric heating device 24 over the entire length of the device, along the heatable surface region. The electrical conductor 38 divides the electric heating device and therefore the heatable surface region into a first partial region, which is arranged essentially on the pressure side and extends from the central electric conductor 38 as far as the outer electric conductor 32 on the pressure side. The other partial region extends from the central electric conductor 38 essentially on the suction side 22 as far as the outer electric conductor 34 which is arranged on the suction side 22.

Figure 2:
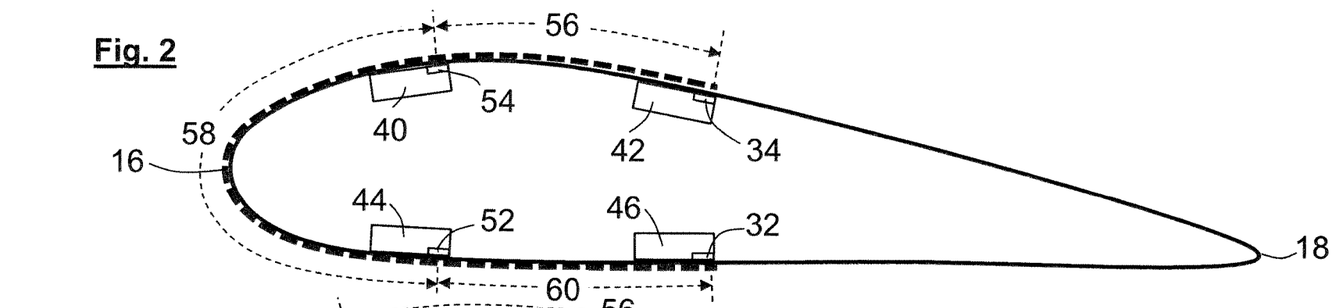
FIGS. 2 to 4 show three further embodiments of wind turbine rotor blades according to the invention, each in schematic cross-sectional illustrations.
Figure 3:
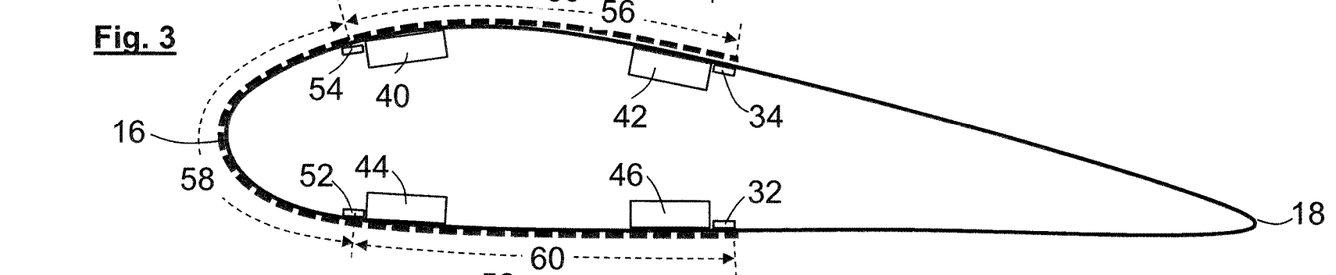
Figure 4:
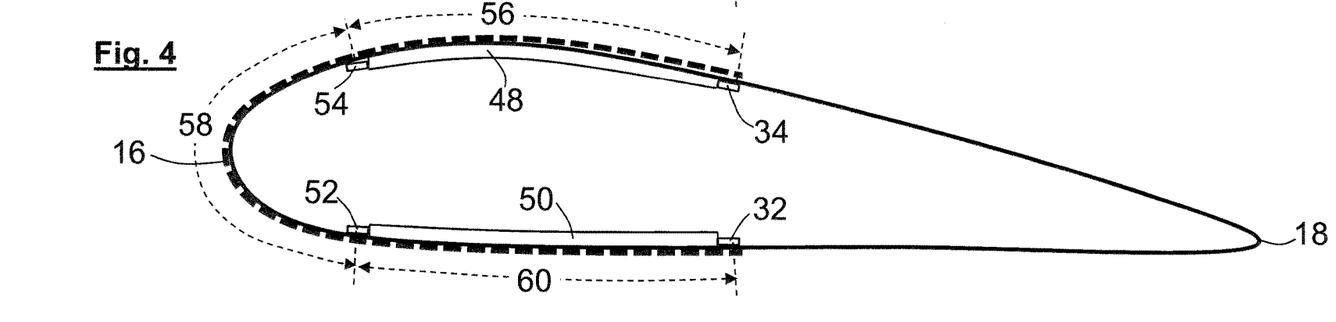

FIGS. 2 to 4 show cross sections of inventive rotor blades. The electric heating device 24 is indicated in each case by a dashed line. The embodiments in FIGS. 2 and 3 each have four spar caps 40 to 46. The spar caps 40, 42 are located on the suction side 22 and are arranged at a distance from one another. The spar caps 44, 46 are located on the pressure side 20 and are also arranged at a distance from one another.

In the embodiment of FIG. 2, the outer electric conductor 32 is integrated into the cross section of the pressure-side spar cap 46. The outer electric conductor 34 is integrated into the cross section of the suction-side spar cap 42. Furthermore, there are two central electric conductors 52, 54 which are integrated into the cross sections of the spar caps 40 and 44. All the electric conductors 32, 34, 52, 54 are electrically connected to the electric heating device 24. The two central electric conductors 52, 54 divide the electric heating device and therefore the heatable surface region into three partial regions 56, 58 and 60.

In the embodiment of FIG. 3, the electric conductors 32, 34, 52, 54 are also connected to the electric heating device 24, but are not integrated into the cross sections of the spar caps 40 to 46 but are instead each arranged adjacent to one of these spar caps 40 to 46.

The embodiment in FIG. 4 has merely two spar caps, specifically two main spar caps 48, 50. The electric conductors 32, 34, 52, 54 are also connected to the electric heating device 24, as in the other embodiments. The main spar caps 48, 50 extend over a relatively large region in the direction of the profile depth. The electric conductors 34, 54 are arranged adjacent to the suction-side main spar cap 48. The electric conductors 32, 52 are arranged adjacent to the pressure-side main spar cap 50. As a result of this arrangement of the electric conductors, the partial region 56 corresponds essentially to the dimensions of the suction-side main spar cap 48, and the partial region 60 corresponds essentially to the dimensions of the pressure-side main spar cap 50, in each case with respect to the direction of the profile depth.

Figure 5:
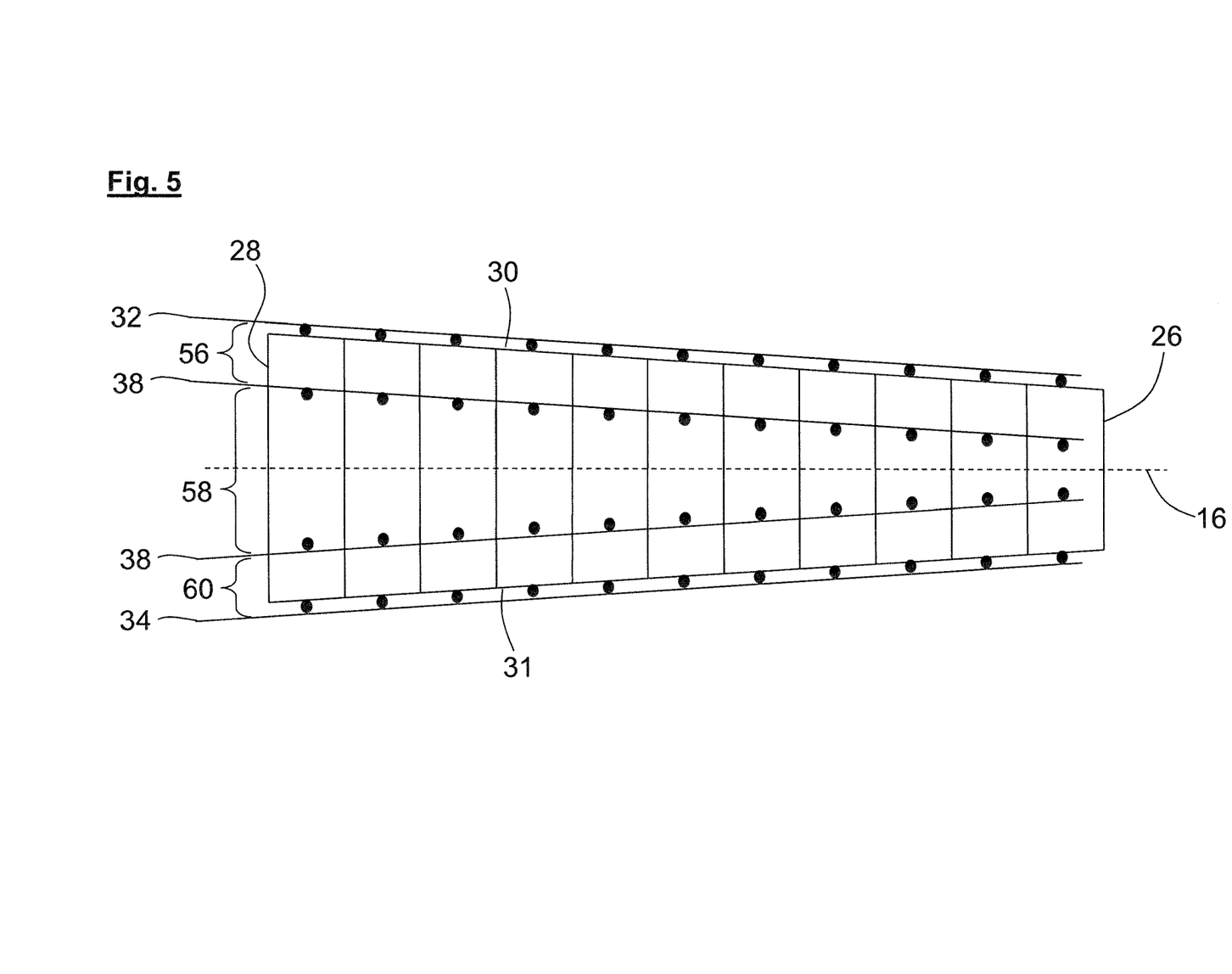
FIG. 5 shows a schematic illustration of an electric heating device with two outer and two central electric conductors; and, FIG. 6 shows a schematic illustration of a detail of an electric heating device with two electrically conductive fiber bundles.

FIG. 5 is a schematic view of an electric heating device with a blade-root-side end 28, a blade-tip-side end 26 and two profile-trailing-edge-side edges 30, 31. Two outer electric conductors 32, 34 run along the profile-trailing-edge-side edges 30, 31 and are connected there to the electric heating device 24 over the entire length thereof, as is indicated by the dots. The electric heating device, and therefore the heatable surface region, is divided into three partial regions 56, 58 and 60 by two central electric conductors 38. The central partial region 58 is located in the region of the profile nose edge 16 which is indicated by dashed lines.

Figure 6:
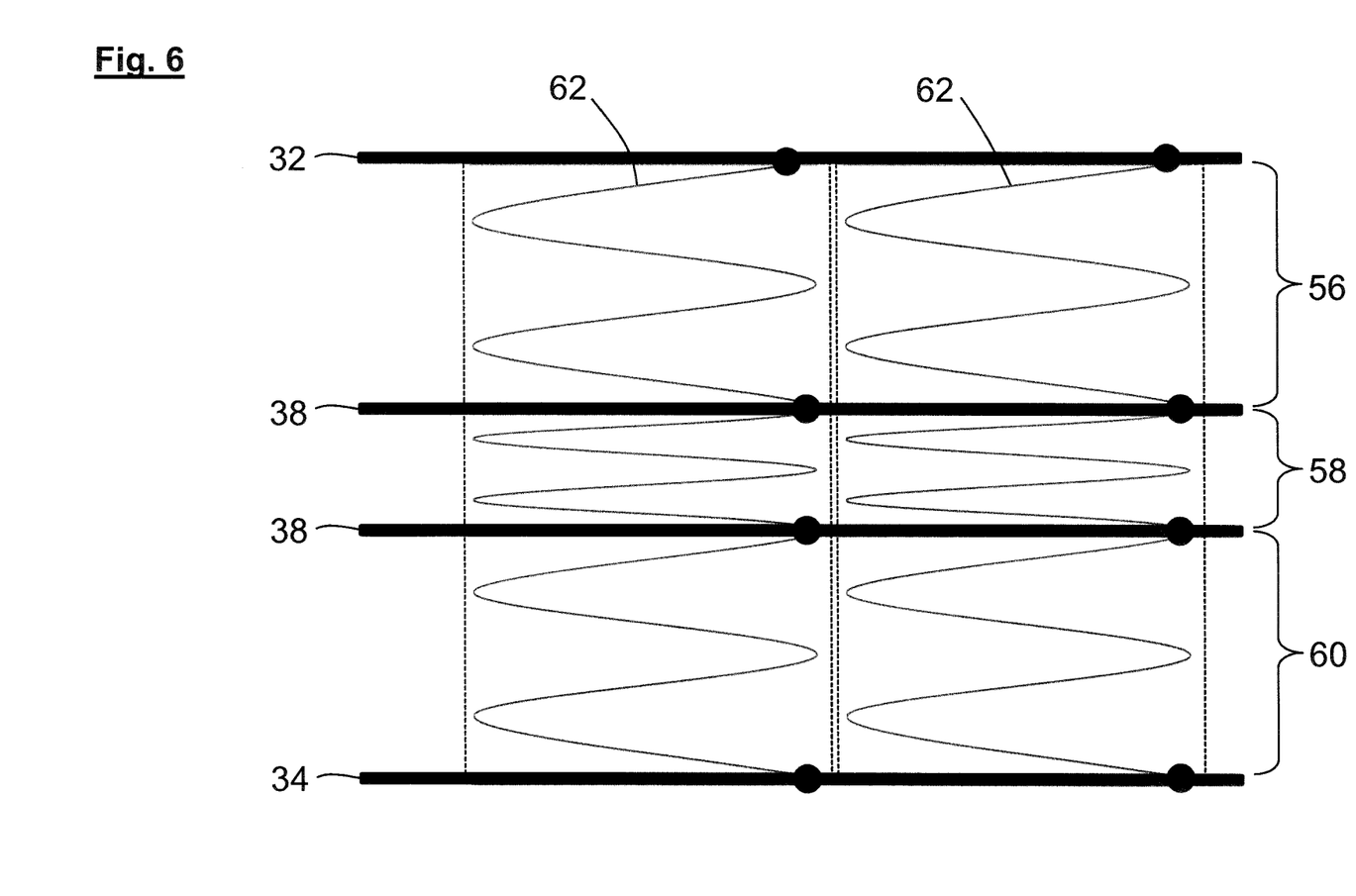

FIG. 6 shows a detail of the arrangement from FIG. 5 in an enlarged form and in a different schematic illustration. It is possible to see the two outer electric conductors 32, 34 and the two central electric conductors 38 as well as two electrically conductive fiber bundles 62 which each form an individual current path and are arranged in a meandering shape and can be composed, for example, of carbon fibers. The two ends of each fiber bundle 62 are connected to the two outer electric conductors 32, 34. At the point where the fiber bundles 62 intersect the central conductors 38, an electrical connection is also formed between the central conductors 38 and the corresponding central sections of the fiber bundles 62. It is possible to see in FIG. 6 schematically that the fiber bundles 62 in the central partial region 58 are concentrated into a relatively small area, with the result that a relatively high specific area heating efficiency is achieved there.

It is understood that the foregoing description is that of the preferred embodiments of the invention and that various changes and modifications may be made thereto without departing from the spirit and scope of the invention as defined in the appended claims.

LIST OF REFERENCE NUMBERS USED

10 Wind turbine rotor blade
12 Blade tip
14 Blade root
16 Profile nose edge
18 Profile end edge
20 Pressure side
22 Suction side
24 Electric heating device
26 Blade-tip-side end
28 Blade-root-side end
30, 31 Profile-trailing-edge-side edges
32, 34 Outer electric conductors
36 Lightning arrestor receptor
38 Central electric conductor
40, 42 Suction-side spar caps
44, 46 Pressure-side spar caps
48 Suction-side main spar cap
50 Pressure-side main spar cap
52, 54 Central electric conductor
56, 58, 60 Partial regions
62 Electrically conductive fiber bundles

What is claimed is:
1. A wind turbine rotor blade comprising:
a rotor blade body defining a longitudinal section and a heatable surface region extending over said longitudinal section;
an electric heating device configured to heat said heatable surface region;
said electric heating device having a blade-tip-side end, a blade-root-side end, a first profile-trailing-edge-side edge and a second profile-trailing-edge-side edge;
a first outer electric conductor connected to said electric heating device along said first profile-trailing-edge-side edge;
a second outer electric conductor connected to said electric heating device along said second profile-trailing-edge-side edge;
the wind turbine rotor blade defining a longitudinal axis;

said electric heating device being configured to be supplied with a heating current via said first outer electric conductor and said second outer electric conductor such that said heating current flows through said heating device in a direction substantially perpendicular to said longitudinal axis; and, at least one central electric conductor connected to said electric heating device at a spaced relationship to said first and second profile-trailing-edge-side edges so as to cause said electric heating device to be divided by said central electric conductor into at least two partial regions which extend over said longitudinal section and can be supplied with an electric heating current separately from one another via two of said first outer electric conductor, said second outer electric conductor and said at least one central electric conductor.

2. The wind turbine of claim 1, wherein:
said at least one central electric conductor consists of a first and a second central electric heating conductor so as to cause said electric heating device to be subdivided into three partial regions including a central partial region; and,
said rotor blade body has a profile nose edge arranged in said central partial region.

3. The wind turbine rotor blade of claim 1, wherein:
each of said first outer electric conductor, said second outer electric conductor and said at least one central electric conductor have electrical connections to said electric heating device produced via at least one of an adhesive bond, a weld, a rivet and a threaded fastener.

4. The wind turbine rotor blade of claim 1, wherein said electric heating device includes a planar carbon fiber material.

5. The wind turbine rotor blade of claim 1, wherein:
said electric heating device includes electrically conductive fiber bundles; and,
said electrically conductive fiber bundles are each electrically connected to at least two of said first outer electric conductor, said second outer electric conductor and said at least one central electric conductor and are electrically insulated from one another.

6. The wind turbine rotor blade of claim 5, wherein:
at least one of said electrically conductive fiber bundles has a first end and a second end;
said first end is connected to said first outer electric conductor;
said second end is connected to said second outer electric conductor; and,
said at least one of said electrically conductive fiber bundles has a central section intersecting said at least one central electric conductor and is connected to said at least one central electric conductor in an electrically conductive manner.

7. The wind turbine rotor blade of claim 1, wherein:
said electric heating device is configured to provide a specific area efficiency; and,
said specific area efficiency is of different magnitudes in corresponding ones of said at least two partial regions when a defined voltage is applied to each two mutually adjacent ones of said first outer electric conductor, said second outer electric conductor and said at least one central electric conductor.

8. The wind turbine rotor blade of claim 1, wherein:
said electric heating device is configured to provide a specific area efficiency; and,
said specific area efficiency varies over a length of one of said at least two partial regions.

9. The wind turbine rotor blade of claim 1, wherein said at least two partial regions include a central partial region, the wind turbine rotor blade further comprising:
a controller configured to actuate said electric heating device in a de-icing operating mode in which all of said at least two partial regions are operated with a first area efficiency; and,
said controller being further configured to actuate said electric heating device in an anti-icing mode in which said central partial region is operated with a second area efficiency which is higher than said first area efficiency and in which the other ones of said at least two partial regions are operated with a third area efficiency which is lower than said first area efficiency.

10. The wind turbine rotor blade of claim 1 further comprising at least one lightning arrestor receptor connected to each of said first outer electric conductor, said second outer electric conductor and said at least one central electric conductor in an electrically conductive manner in case of a lightning strike.

11. The wind turbine rotor blade of claim 1 further comprising:
at least one spar cap; and,
at least one of said first outer electric conductor, said second outer electric conductor and said at least one central electric conductor being arranged adjacent to a respective one of said at least one spar cap.

12. The wind turbine rotor blade of claim 1 further comprising:
at least one spar cap defining a spar cap cross section; and,
at least one of said first outer electric conductor, said second outer electric conductor and said at least one central electric conductor being integrated into a respective one of said at least one spar cap.

13. The wind turbine rotor blade of claim 11, wherein:
said at least one spar cap includes a first pressure-side spar cap, a second pressure-side spar cap, a first suction-side spar cap and a second suction-side spar cap;
said at least one central electric conductor includes a first central electric conductor and a second central electric conductor;
said first outer electric conductor is assigned to said first pressure-side spar cap;
said second outer electric conductor is assigned to said first suction-side spar cap;
said first central electric conductor is assigned to said second pressure-side spar cap; and,
said second central electric conductor is assigned to said second suction-side spar cap.

14. The wind turbine rotor blade of claim 12, wherein:
said at least one spar cap includes a first pressure-side spar cap, a second pressure-side spar cap, a first suction-side spar cap and a second suction-side spar cap;
said at least one central electric conductor includes a first central electric conductor and a second central electric conductor;
said first outer electric conductor is assigned to said first pressure-side spar cap;
said second outer electric conductor is assigned to said first suction-side spar cap;
said first central electric conductor is assigned to said second pressure-side spar cap; and,
said second central electric conductor is assigned to said second suction-side spar cap.

15. A wind turbine rotor blade comprising:

a rotor blade body defining a longitudinal section and a heatable surface region extending over said longitudinal section;

an electric heating device configured to heat said heatable surface region;

said electric heating device having a blade-tip-side end, a blade-root-side end, a first profile-trailing-edge-side edge and a second profile-trailing-edge-side edge;

a first outer electric conductor connected to said electric heating device along said first profile-trailing-edge-side edge;

a second outer electric conductor connected to said electric heating device along said second profile-trailing-edge-side edge;

the wind turbine rotor blade defining a longitudinal axis;

said electric heating device being configured to be supplied with a heating current via said first outer electric conductor and said second outer electric conductor such that said heating current flows through said heating device in a direction substantially perpendicular to said longitudinal axis;

at least one central electric conductor connected to said electric heating device at a spaced relationship to said first and second profile-trailing-edge-side edges so as to cause said electric heating device to be divided by said central electric conductor into at least two partial regions which extend over said longitudinal section and can be supplied with an electric heating current separately from one another via two of said first outer electric conductor, said second outer electric conductor and said at least one central electric conductor;

said electric heating device including electrically conductive fiber bundles;

said electrically conductive fiber bundles each being electrically connected to at least two of said first outer electric conductor, said second outer electric conductor and said at least one central electric conductor;

said electrically conductive fiber bundles being electrically insulated from one another;

at least one of said electrically conductive fiber bundles having a first end and a second end;

said first end being connected to said first outer electric conductor;

said second end being connected to said second outer electric conductor; and, said at least one of said electrically conductive fiber bundles having a central section intersecting said at least one central electric conductor and being connected to said at least one central electric conductor in an electrically conductive manner.

* * * * *